United States Patent

Varkey et al.

(10) Patent No.: US 7,860,362 B2
(45) Date of Patent: Dec. 28, 2010

(54) ENHANCED FIBER OPTIC SEISMIC LAND CABLE

(75) Inventors: Joseph Varkey, Sugar Land, TX (US); Vladimir Hernandez-Solis, Stafford, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/135,002

(22) Filed: Jun. 6, 2008

(65) Prior Publication Data

US 2009/0046983 A1  Feb. 19, 2009

Related U.S. Application Data

(60) Provisional application No. 60/933,931, filed on Jun. 8, 2007.

(51) Int. Cl.
*G02B 6/44* (2006.01)
(52) U.S. Cl. .................. 385/105; 385/101; 385/107
(58) Field of Classification Search ......... 385/101–107, 385/111–113
See application file for complete search history.

(56) References Cited

U.S. PATENT DOCUMENTS

| | | | |
|---|---|---|---|
| 2,000,355 A * | 5/1935 | Sichtermann | 174/27 |
| 4,183,621 A | 1/1980 | Kao | |
| 4,359,598 A * | 11/1982 | Dey et al. | 174/40 R |
| 4,375,313 A | 3/1983 | Anderson | |
| 4,416,508 A * | 11/1983 | Dey et al. | 385/110 |
| 4,422,718 A * | 12/1983 | Nakagome et al. | 385/113 |
| 4,490,009 A * | 12/1984 | Nakai et al. | 385/101 |
| 4,522,464 A | 6/1985 | Thompson | |
| 4,524,436 A | 6/1985 | Hall | |
| 4,563,757 A | 1/1986 | Decorps | |
| 4,575,831 A | 3/1986 | Decorps | |
| 4,651,917 A * | 3/1987 | Gould et al. | 228/173.5 |
| 4,696,542 A | 9/1987 | Thompson | |
| 4,705,353 A | 11/1987 | Wagoner | |
| 4,867,528 A * | 9/1989 | Funaki et al. | 385/108 |
| 4,907,855 A | 3/1990 | Oestreich | |
| 5,115,485 A | 5/1992 | Gandy | |
| 5,202,944 A | 4/1993 | Riordan | |
| 5,495,547 A | 2/1996 | Rafie | |
| 6,009,216 A | 12/1999 | Pruett | |
| 6,060,662 A | 5/2000 | Rafie | |
| 6,192,983 B1 | 2/2001 | Neuroth | |
| 6,236,789 B1 * | 5/2001 | Fitz | 385/101 |

(Continued)

FOREIGN PATENT DOCUMENTS

EP  0853249 A1  7/1998

(Continued)

OTHER PUBLICATIONS

PCT Search Report, dated Feb. 27, 2009, for Application No. PCT/US2008/066318.

*Primary Examiner*—Rhonda S Peace

(57) ABSTRACT

A fiber optic cable comprises a cable core comprising at least one optical fiber and one of at least one electrical conductor and at least one strength member disposed adjacent the at least one optical fiber, at least one polymeric inner layer enclosing the cable core, and at least one polymeric outer layer enclosing the cable core and the inner layer to form the fiber optic cable, the outer layer operable to maintain integrity of the cable within a predetermined temperature range.

19 Claims, 10 Drawing Sheets

U.S. PATENT DOCUMENTS

| | | |
|---|---|---|
| 6,260,656 B1 | 7/2001 | Orban |
| 6,281,489 B1 | 8/2001 | Tubel |
| 6,392,151 B1 | 5/2002 | Rafie |
| 6,400,873 B1 | 6/2002 | Gimblet |
| 6,531,694 B2 | 3/2003 | Tubel |
| 6,600,108 B1 | 7/2003 | Mydur |
| 6,714,708 B2 | 3/2004 | McAlpine |
| 6,727,828 B1 | 4/2004 | Malone |
| 6,779,927 B2 | 8/2004 | Cens |
| 7,119,283 B1 | 10/2006 | Varkey |
| 7,140,435 B2 | 11/2006 | Defretin |
| 7,170,007 B2 | 1/2007 | Varkey |
| 7,188,406 B2 | 3/2007 | Varkey |
| 7,235,743 B2 | 6/2007 | Varkey |
| 7,259,331 B2 | 8/2007 | Sridhar |
| 7,288,721 B2 | 10/2007 | Varkey |
| 7,294,787 B2 | 11/2007 | Varkey |
| 7,324,730 B2 | 1/2008 | Varkey |
| 7,326,854 B2 | 2/2008 | Varkey |
| 7,402,753 B2 | 7/2008 | Varkey |
| 7,462,781 B2 | 12/2008 | Varkey |
| 7,465,876 B2 | 12/2008 | Varkey |
| 2002/0009272 A1* | 1/2002 | Parris .................. 385/109 |
| 2004/0045735 A1 | 3/2004 | Varkey |
| 2006/0045442 A1 | 3/2006 | Varkey |
| 2006/0065429 A1* | 3/2006 | Kim et al. .............. 174/120 R |
| 2006/0137895 A1* | 6/2006 | Varkey et al. ........... 174/113 R |
| 2006/0137898 A1* | 6/2006 | Kim et al. .............. 174/120 R |
| 2006/0151194 A1* | 7/2006 | Varkey et al. ........... 174/102 R |
| 2006/0242824 A1* | 11/2006 | Varkey et al. ............ 29/825 |
| 2006/0280412 A1 | 12/2006 | Varkey |
| 2007/0102186 A1* | 5/2007 | Varkey .................. 174/102 R |
| 2007/0107928 A1* | 5/2007 | Varkey et al. ........... 174/102 R |
| 2008/0031578 A1* | 2/2008 | Varkey et al. ............ 385/100 |
| 2008/0118209 A1* | 5/2008 | Varkey et al. ............ 385/101 |
| 2008/0128152 A1* | 6/2008 | Varkey et al. ............ 174/116 |
| 2008/0289851 A1* | 11/2008 | Varkey et al. ............ 174/115 |

FOREIGN PATENT DOCUMENTS

| | | |
|---|---|---|
| GB | 2275953 | 9/1994 |
| WO | 9641066 | 12/1996 |
| WO | 0005612 | 2/2000 |
| WO | 2006131871 A2 | 12/2006 |

\* cited by examiner

ENHANCED FIBER OPTIC SEISMIC LAND CABLE

CROSS-REFERENCE TO RELATED APPLICATION

This application is entitled to the benefit of, and claims priority to, provisional patent application U.S. 60/933,931 filed Jun. 8, 2007, the entire disclosure of which is incorporated herein by reference.

BACKGROUND OF THE INVENTION

The present invention relates generally to cables and, in particular, to an enhanced fiber optic cable.

SUMMARY OF THE INVENTION

An embodiment of a fiber optic cable comprises a cable core comprising at least one optical fiber and one of at least one electrical conductor and at least one strength member disposed adjacent the at least one optical fiber, at least one polymeric inner layer enclosing the cable core, and at least one polymeric outer layer enclosing the cable core and the inner layer to form the fiber optic cable, the outer layer operable to maintain integrity of the cable within a predetermined temperature range. The predetermined temperature range may be from about −60° Celsius to about 150° Celsius. Alternatively, the outer layer comprises one of polyamide, thermoplastic polyurethane, thermoplastic vulcanizate, a hard grade thermoplastic elastomer, ethylene chlorotrifluoroethylene, ethylene-tetrafluoroethylene copolymer, and combinations thereof. Alternatively, the inner layer comprises one of polyolefin, fluoropolymer, thermoplastic elastomer, thermoplastic vulcanizate and combinations thereof. Alternatively, the electrical conductor or the strength member comprises one of a plurality of conductors helically wound about the optical fiber and at least a pair of shaped profiles surrounding the optical fiber.

Alternatively, the cable further comprises at least one layer of strength members disposed within the outer layer. At least one of the strength members may be operable to transmit electrical power. At least one of the strength members may be formed from Kevlar material, which may be oriented at a zero lay angle with respect to the cable core. Alternatively, the cable further comprises at least one shield layer disposed adjacent at least one of the cable core, the inner layer, and the outer layer. The shield layer may comprise one of interlocking metallic tape and metallic mesh tape.

Alternatively, the cable further comprises an intermediate tie layer disposed between the inner layer and the outer layer and operable to bind with both the inner layer and the outer layer. The intermediate tie layer may comprises one of modified polyethylene, modified fluoropolymer, modified polypropylene, modified ethylene-propylene copolymer, modified poly(4-methyl-1-pentene), modified thermoplastic vulcanizate, modified thermoplastic elastomer, modified ethylene-tetrafluoroethylene copolymer, modified ethylene fluorinated ethylene-propylene, modified polychlorotrifluoroethylene, modified ethylene chlorotrifluoroethylene, expanded-Polytetrafluoroethylene (ePTFE) and combinations thereof.

Alternatively, the cable further comprises an intermediate layer disposed between the inner layer and the outer layer, the intermediate layer comprising at least pair of polymeric shaped profiles including a plurality of electrical conductors disposed therein. The electrical conductors disposed in the intermediate layer may comprise one of solid conductors, stranded conductors, and arc-shaped conductors.

In another embodiment, a fiber optic cable assembly comprises a cable core comprising, at least one filler rod, a plurality of conductors arranged about the filler rod to form the cable core, the conductors having internal interstices therebetween filled by the filler rod, each of the conductors comprising, a conductor core comprising at least one optical fiber and one of at least one electrical conductor and at least one strength member disposed adjacent the at least one optical fiber, at least one polymeric inner layer enclosing the conductor core, and at least one polymeric outer layer enclosing the conductor core and the inner layer to form the conductor, the outer layer operable to maintain integrity of the conductor within a predetermined temperature range, wherein the cable core is enclosed by a filler layer of elastomeric material that fills external interstices between the conductors to form the fiber optic cable assembly.

Alternatively, the conductors forming the cable core comprise one of a triad configuration, a quad configuration, and a hepta configuration. Alternatively, the cable assembly further comprises a jacket layer enclosing the filler layer and the cable core. A plurality of strength members may be embedded in the jacket layer. Alternatively, the cable assembly further comprises at least one shield layer enclosing the filler layer. Alternatively, the filler rod is formed from one of a soft polymeric material, a hard TPE coated rod, and a hard TPE coated rod yarn.

In another embodiment, a method for forming a cable comprises providing at least one filler rod, cabling a plurality of conductors about the filler rod to form a cable core, the filler rod filling internal interstices between the conductors, wherein each of the conductors comprise a conductor core comprising at least one optical fiber and one of at least one electrical conductor and at least one strength member disposed adjacent the at least one optical fiber, at least one polymeric inner layer enclosing the conductor core, and at least one polymeric outer layer enclosing the conductor core and the inner layer to form the conductor, the outer layer operable to maintain integrity of the conductor within a predetermined temperature range, and enclosing the cable core with a filler layer of elastomeric material that fills external interstices between the conductors to form the fiber optic cable assembly.

Alternatively, the method further comprises enclosing the cable core and filler layer in a jacket layer. Alternatively, the method further comprises disposing at least one strength member in the jacket layer. Alternatively, the method further comprises heating the filler rod to assist in cabling the conductors about the filler rod. Alternatively, the filler rod and the filler layer are extruded. Alternatively, the method further comprises disposing at least one shield layer adjacent at least one of the cable core, the inner layer, and the outer layer.

Embodiments of cables or cable assemblies may be advantageously utilized in whole or in part as embodiments of land seismic sensor cables, "truck" or "backbone" seismic cables, or other cable systems or assemblies. Individual conductors can be used as sensor cables. Multiple conductors can be combined using a modular design strategy to form "truck" or "backbone" seismic cables or cable assemblies.

Embodiments of cables or cable assemblies may be used alone or in combination to create land seismic cables with some or all of the following characteristics, no crosstalk, lower weight (smaller cable size), lower cost, easy manufacturing, water blocking capabilities, the ability to perform well at arctic and tropical temperatures, resistance to animal bite damage. Embodiments of cables or cable assemblies may comprise optical fiber packaging that can withstand bending or crushing without suffering major optical attenuation, can be run over by trucks without suffering damage, and is easily spliced and terminated. Crosstalk may be eliminated by using dual-use conductors or cables comprising optical fibers for telemetry and copper wire for electrical power transmission in a single cable or cable assembly. The potential for bonding between all materials in the cable core significantly increases the cable's resistance to water infiltration. The conductor insulation's three-layered bonded design is also easily potted to various potting compounds.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
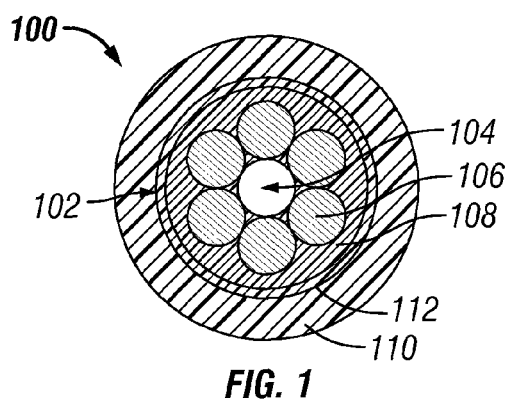
FIG. 1 is a radial cross-sectional view of an embodiment of a cable.
Figure 2:
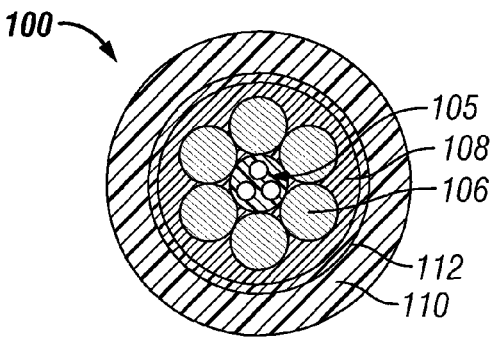
FIG. 2 is a radial cross-sectional view of an alternate embodiment of a cable.
Figure 3A:
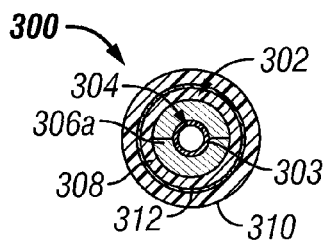
FIGS. 3a-3h are radial cross-sectional views, respectively, of alternate embodiments of a cable.
Figure 3B:
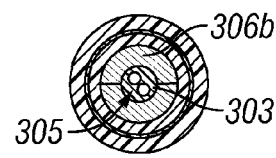
Figure 3C:
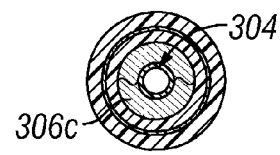
Figure 3D:
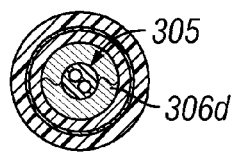
Figure 3E:
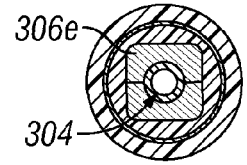
Figure 3F:
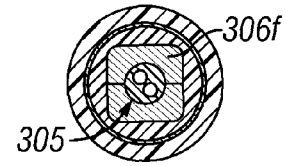
Figure 3G:
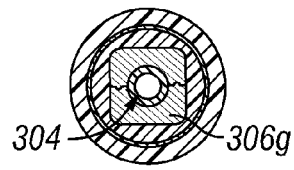
Figure 3H:
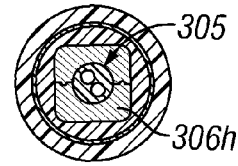

Referring now to FIGS. 1 and 2, there is shown an embodiment of a cable, indicated generally at 100. The cable 100 includes a cable core 102 comprising at optical fiber 104 (FIG. 1) or a plurality of optical fibers 105 (FIG. 2) and a plurality of electrical conductors 106 (only one indicated) cabled preferably helically around the optical fiber 104 or 105. The optical fiber 104 shown in FIG. 1 is a single optical fiber, while the optical fiber 105 shown in FIG. 2 is an optical fiber bundle comprising a plurality of optical fibers. The optical fibers 104 or 105 may be a single-mode fiber(s) or a multiple-mode fiber(s). Preferably, the electrical conductors 106 are formed from a copper material or similarly electrically conductive material. An inner or insulating layer 108 formed from a polymeric material, for example, encases the optical fiber 104 or 105 and the electrical conductors 106 of the cable core 102. The inner layer 108 is preferably an electrically insulating layer. An outer or jacket layer 110 formed from a polymeric material, for example, encases the inner layer 108 and an optional tie layer 112 formed from a polymeric material, for example, is disposed between the inner layer 108 and the outer layer 110.

The optical fiber 104 or 105 is preferably in communication with, for example, an optical light source (not shown) and an optical sensor (not shown) and is operable to transmit data and/or telemetry between the optical sensor and the light source. The electrical conductors 106 are preferably in communication with, for example, a source of electrical power (not shown) and an electrical tool or device (not shown) and are operable to transmit electrical power between the electrical power source and the electrical tool or device.

Alternatively, the electrical conductors 106 of the cable 100 are strength members and are formed from steel or similar metallic or other suitable material strength members. In such a cable, the conductors 106 are not in communication with either the electrical power source or the electrical tool or device and the cable 100 is utilized solely to transmit data and/or telemetry, as will be appreciated by those skilled in the art.

Referring now to FIGS. 3a-3h, there is shown an embodiment of a cable, indicated generally at 300. The cable 300 includes a cable core 302 comprising at optical fiber 304 (FIGS. 3a, 3c, 3e, 3g) or a plurality of optical fibers 305 (FIGS. 3b, 3d, 3f, 3h) and at least a pair of shaped profiles or electrical conductors 306a-306h disposed around the optical fiber 304 or 305. The optical fiber 304 shown in FIGS. 3a, 3c, 3e, 3g is a single optical fiber, while the optical fiber 305 shown in FIGS. 3b, 3d, 3f, 3h is a multiple optical fiber bundle. The optical fiber 304 or 305 is preferably coated with a polymeric coating 303. Preferably, the electrical conductors 306a-306h are formed from a copper material or similarly electrically conductive material. The electrical conductors may be shaped so as to form a circular cross section when joined (see 306a, 306b, 306c, and 306d) or to form a substantially square shaped cross section when joined (see 306e, 306f, 306g, and 306h). The conductors may be joined together along a straight seam (see 306a, 306b, 306e, and 306f) or the conductors may include features such as, but not limited to, notches or grooves (see 306c, 306d, 306g, and 306h). Additionally, the electrical conductors 306 may be shaped to form any suitable shape when joined including, but not limited to, triangular, rectangular, or the like, such as those shown in commonly owned and co-pending application Ser. No. 11/461,943, incorporated by reference herein in its entirety.

An inner layer 308 (indicated in FIG. 3a only) formed from a polymeric material, for example, encases the optical fiber 304 or 305 and the electrical conductors 306a-306h of the cable core 302. An outer layer 310 (indicated in FIG. 3a only) formed from a polymeric material, for example, encases the inner layer 308 and an optional tie layer 312 (indicated in FIG. 3a only) is disposed between the inner layer 308 and the outer layer 310.

The optical fiber 304 or 305 is preferably in communication with, for example, an optical light source (not shown) and an optical sensor (not shown) and is operable to transmit data and/or telemetry between the optical sensor and the light source. The electrical conductors 306a-h are preferably in communication with, for example, a source of electrical power (not shown) and an electrical tool or device (not shown) and are operable to transmit electrical power between the electrical power source and the electrical tool or device.

Alternatively, the electrical conductors 306a-h of the cable 300 are strength members and are formed from steel or similar metallic or other suitable material strength members. In such a cable, the conductors 306a-h are not in communication with either the electrical power source or the electrical tool or device and the cable 300 is utilized solely to transmit data and/or telemetry, as will be appreciated by those skilled in the art.

Figure 4:
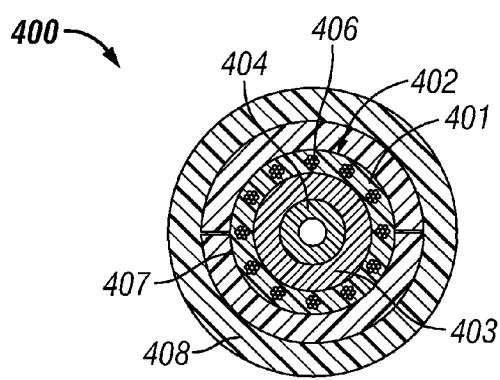
FIG. 4 is a radial cross-sectional view of an alternate embodiment of a cable.
Figure 5:
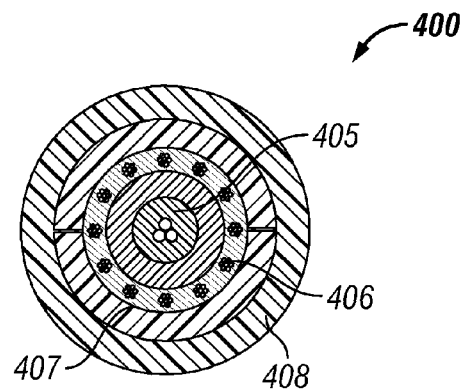
FIG. 5 is a radial cross-sectional view of an alternate embodiment of a cable.

Referring now to FIGS. 4 and 5, there is shown an embodiment of a cable, indicated generally at 400. The cable 400 includes a cable core 402 comprising at optical fiber 404 (FIG. 4) and a plurality of optical fibers 405 (FIG. 5) and a plurality of inner electrical conductors 406 (only one indicated) cabled preferably helically around the optical fiber 404 or 405 that are embedded in a layer of polymeric material 401. The electrical conductors 406 may be solid conductors or stranded conductors. At least a pair of preformed outer electrical conductors 407 is disposed around the layer 401 and the inner layer of electrical conductors 406. The optical fiber 404 shown in FIG. 1 is a single optical fiber, while the optical fiber 405 shown in FIG. 2 is a multiple optical fiber bundle. The optical fiber 404 or 405 is preferably coated with a polymeric coating 403. Preferably, the electrical conductors 406 and 407 are formed from a copper material or similarly electrically conductive material. The electrical conductors 407 may be shaped so as to form a circular cross section when joined or may a substantially square or other suitably shaped cross sections when joined (not shown, see FIGS. 3e-3h).

An inner layer 408 formed from a polymeric material, for example, encases the optical fiber 404 or 405 and the electrical conductors 406 and 407 of the cable core 402. An outer layer (not shown) formed from a polymeric material, for example, may encase the inner layer 408 and an optional tie layer (not shown) may be disposed between the inner layer 408 and the outer layer.

The optical fiber 404 or 405 is preferably in communication with, for example, an optical light source (not shown) and an optical sensor (not shown) and is operable to transmit data and/or telemetry between the optical sensor and the light source. The electrical conductors 406 and 407 are preferably in communication with, for example, a source of electrical power (not shown) and an electrical tool or device (not shown) and are operable to transmit electrical power between the electrical power source and the electrical tool or device. Preferably, one of the electrical conductors 406 and 407 handles positive current and the other of the electrical conductors 406 and 407 handles negative current.

Alternatively, the electrical conductors 406 and 407 of the cable 400 are strength members and are formed from steel or similar metallic or other suitable material strength members. In such a cable, the conductors 406 and 407 are not in communication with either the electrical power source or the electrical tool or device and the cable 400 is utilized solely to transmit data and/or telemetry, as will be appreciated by those skilled in the art.

Figure 6:
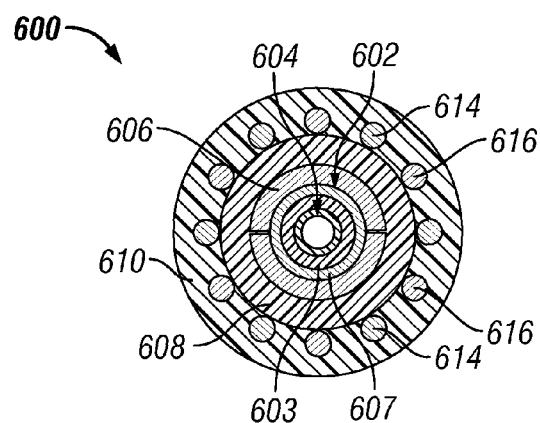
FIG. 6 is a radial cross-sectional view of an alternate embodiment of a cable.
Figure 7:
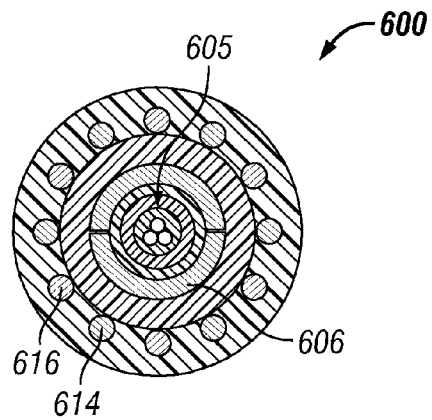
FIG. 7 is a radial cross-sectional view of an alternate embodiment of a cable.

Referring now to FIGS. 6 and 7, there is shown an embodiment of a cable, indicated generally at 600. The cable 600 includes a cable core 602 comprising at optical fiber 604 (FIG. 6) or a plurality of optical fibers 605 (FIG. 7) and at least a pair of preformed electrical conductors 606 disposed around the optical fiber 604 or 605. The optical fiber 604 shown in FIG. 6 is a single optical fiber, while the optical fiber 605 shown in FIG. 7 is a multiple optical fiber bundle. The optical fiber 604 or 605 is preferably coated with a polymeric coating 603. The optical fiber 604 or 605 is preferably coated with a polymeric coating 603. A polymeric material 607 separates the optical fibers 604 or 605 from the conductors 606. Preferably, the electrical conductors 606 are formed from a copper material or similarly electrically conductive material. The electrical conductors 606 may be shaped so as to form a circular cross section when joined or may a substantially square or other suitably shaped cross sections when joined (not shown, see FIGS. 3e-3h).

An inner layer 608 formed from a polymeric material, for example, encases the optical fiber 604 or 605 and the electrical conductors 606 of the cable core 602. An outer layer 610 formed from a polymeric material, for example, encases the inner layer 608 and an optional tie layer 612 is disposed between the inner layer 608 and the outer layer 610. A layer of members including strength members 614 and electrical conductors 616 are disposed within the outer layer 610. Alternatively, a second layer of members (not shown) is disposed within the outer layer 610 in order to obtain torque balance for the cable 600.

The optical fiber 604 or 605 is preferably in communication with, for example, an optical light source (not shown) and an optical sensor (not shown) and is operable to transmit data and/or telemetry between the optical sensor and the light source. The electrical conductors 606 and 616 are preferably in communication with, for example, a source of electrical power (not shown) and an electrical tool or device (not shown) and are operable to transmit electrical power between the electrical power source and the electrical tool or device. Preferably, one of the electrical conductors 606 and 616 handles positive current and the other of the electrical conductors 606 and 616 handles negative current.

Alternatively, the electrical conductors 606 and 616 of the cable 600 are strength members and are formed from steel or similar metallic or other suitable material strength members. In such a cable, the conductors 606 and 616 are not in communication with either the electrical power source or the electrical tool or device and the cable 600 is utilized solely to transmit data and/or telemetry, as will be appreciated by those skilled in the art.

Figure 8A:
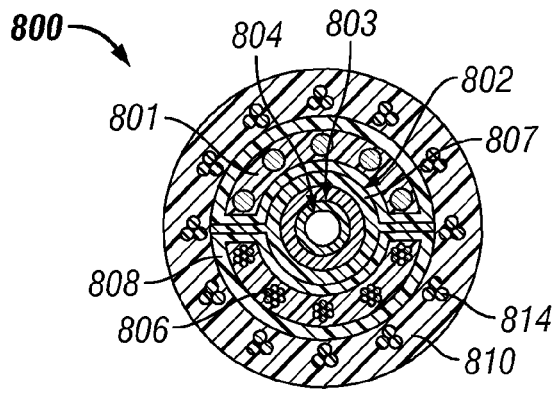
FIGS. 8a-8d are radial cross-sectional views, respectively, of alternate embodiments of a cable and a shaped profile for use in a cable.
Figure 9A:
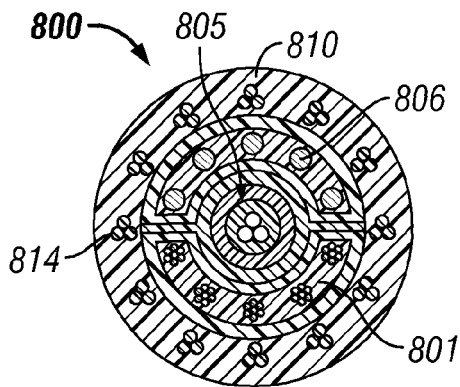
FIGS. 9a-9c are radial cross-sectional views, respectively, of alternate embodiments of a cable.
Figure 9B:
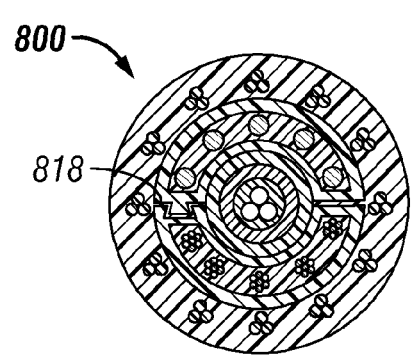
Figure 9C:
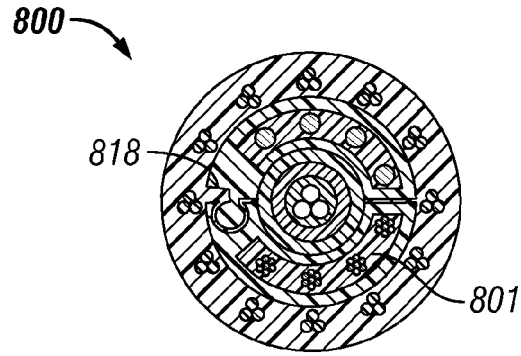

Referring now to FIGS. 8a and 9a, there is shown an embodiment of a cable, indicated generally at 800. The cable 800 includes a cable core 802 comprising at optical fiber 804 (FIG. 8a) or a plurality of optical fibers 805 (FIG. 9a) and at least a pair of preferably polymeric shaped profiles or shells 801 disposed around the optical fiber 804 or 805. A plurality of electrical conductors 806 are embedded within the profiles 801. The optical fiber 804 shown in FIG. 8a is a single optical fiber, while the optical fiber 805 shown in FIG. 9a is a multiple optical fiber bundle. The optical fiber 804 or 805 is preferably coated with a polymeric coating 803. A polymeric material 807 separates the optical fibers 804 or 805 from the profiles 801 and separates the profiles 801 from the other profile 801. The electrical conductors 806 may be solid conductors or stranded conductors. Preferably, the electrical conductors 806 are formed from a copper material or similarly electrically conductive material. The profiles 801 may be shaped so as to form a circular cross section when joined or may a substantially square or other suitably shaped cross sections when joined (not shown).

An inner layer 808 formed from a polymeric material, for example, encases the optical fiber 804 or 805 and the profiles 801 and electrical conductors 806 of the cable core 802. An outer layer 810 formed from a polymeric material, for example, encases the inner layer 808 and an optional tie layer (not shown) may be disposed between the inner layer 808 and the outer layer 810. A layer of strength members 814 is disposed within the inner layer 808. The strength members 814 are preferably formed from a Kevlar material or similar material and are preferably oriented at a zero lay angle with respect to the cable core 802.

The optical fiber 804 or 805 is preferably in communication with, for example, an optical light source (not shown) and an optical sensor (not shown) and is operable to transmit data and/or telemetry between the optical sensor and the light source. The electrical conductors 806 are preferably in communication with, for example, a source of electrical power (not shown) and an electrical tool or device (not shown) and are operable to transmit electrical power between the electrical power source and the electrical tool or device. One set of the electrical conductors 806 in one of the shaped profiles or shells 801 may handle positive current and the other of the electrical conductors 806 in the other of the shaped profiles 801 may handle negative current.

Figure 8B:
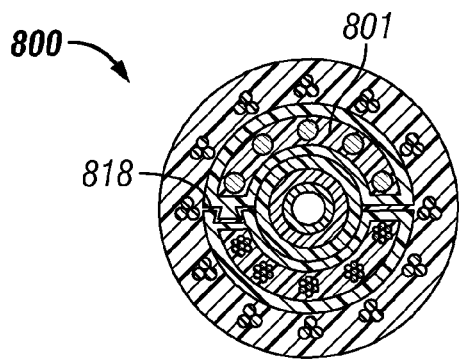
Figure 8C:
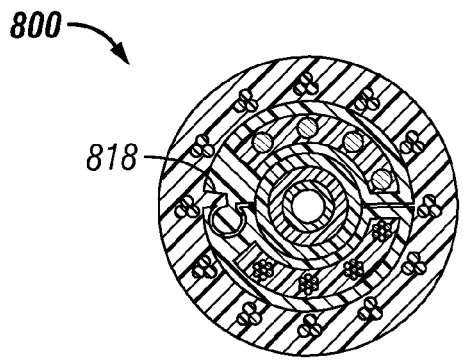
Figure 8D:
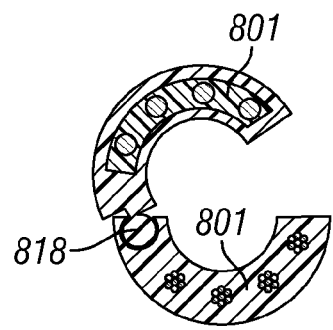

Referring now to FIGS. 8b, 8c, 9b, and 9c, the shells or shaped profiles 801 may be hinged at a hinge point 818 (shown in an unassembled position in FIG. 8d) in order to assembly the cable core 802 and enclose the optical fiber 804 or 805. Alternatively, the profiles 801 (with or without the hinge point 818) may be formed from steel or similar material as solid strength members with no electrical conductors embedded therein.

Figure 10:
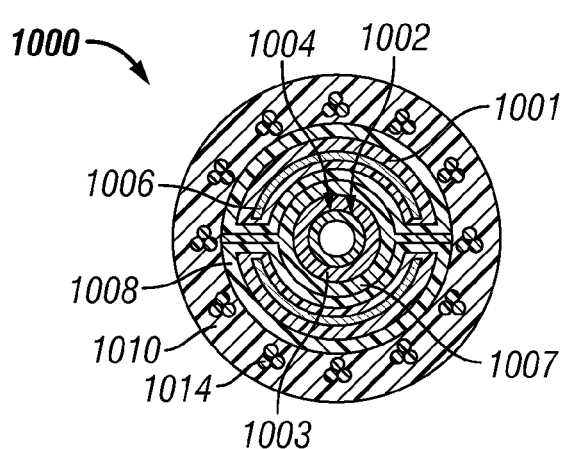
FIG. 10 is a radial cross-sectional view of an alternate embodiment of a cable.
Figure 11:
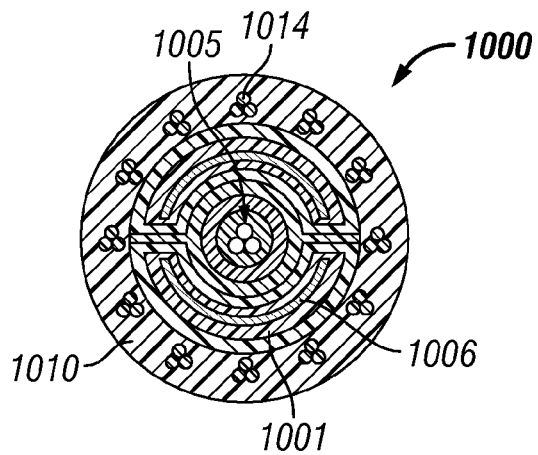
FIG. 11 is a radial cross-sectional view of an alternate embodiment of a cable.

Referring now to FIGS. 10 and 11, there is shown an embodiment of a cable, indicated generally at 1000. The cable 1000 includes a cable core 1002 comprising at optical fiber 1004 (FIG. 10) or a plurality of optical fibers 1005 (FIG. 11) and at least a pair of preformed and preferably polymeric shaped profiles or shells 1001 disposed around the optical fiber 1004 or 1005. An electrical conductor 1006 is embedded within each of the shaped profiles 1001. The optical fiber 1004 shown in FIG. 10 is a single optical fiber, while the optical fiber 1005 shown in FIG. 11 is a multiple optical fiber bundle. The optical fiber 1004 or 1005 is preferably coated with a polymeric coating 1003. A polymeric material 1007 separates the optical fibers 1004 or 1005 from the profiles 1001 and separates the profiles 1001 from the other profile 1001. The electrical conductors 1006 are preferably arc-shaped and conform to the shape of the shaped profiles 1001. Preferably, the electrical conductors 1006 are formed from a copper material or similarly electrically conductive material. The shaped profiles 1001 may be shaped so as to form a circular cross section when joined or may a substantially square or other suitably shaped cross sections when joined (not shown).

An inner layer 1008 formed from a polymeric material, for example, encases the optical fiber 1004 or 1005 and the shells or shaped profiles 1001 and electrical conductors 1006 of the cable core 1002. An outer layer 1010 formed from a polymeric material, for example, encases the inner layer 1008 and an optional tie layer (not shown) may be disposed between the inner layer 1008 and the outer layer 1010. A layer of strength members 1014 is disposed within the outer layer 1010. The strength members 1014 are preferably formed from a Kevlar material or similar material and are preferably oriented at a zero lay angle with respect to the cable core 1002.

The optical fiber 1004 or 1005 is preferably in communication with, for example, an optical light source (not shown) and an optical sensor (not shown) and is operable to transmit data and/or telemetry between the optical sensor and the light source. The electrical conductors 1006 are preferably in communication with, for example, a source of electrical power (not shown) and an electrical tool or device (not shown) and are operable to transmit electrical power between the electrical power source and the electrical tool or device. One set of the electrical conductors 1006 in one of the shells or shaped profiles 1001 may handle positive current and the other of the electrical conductors 1006 in the other of the shaped profiles 1001 may handle negative current.

Figure 12:
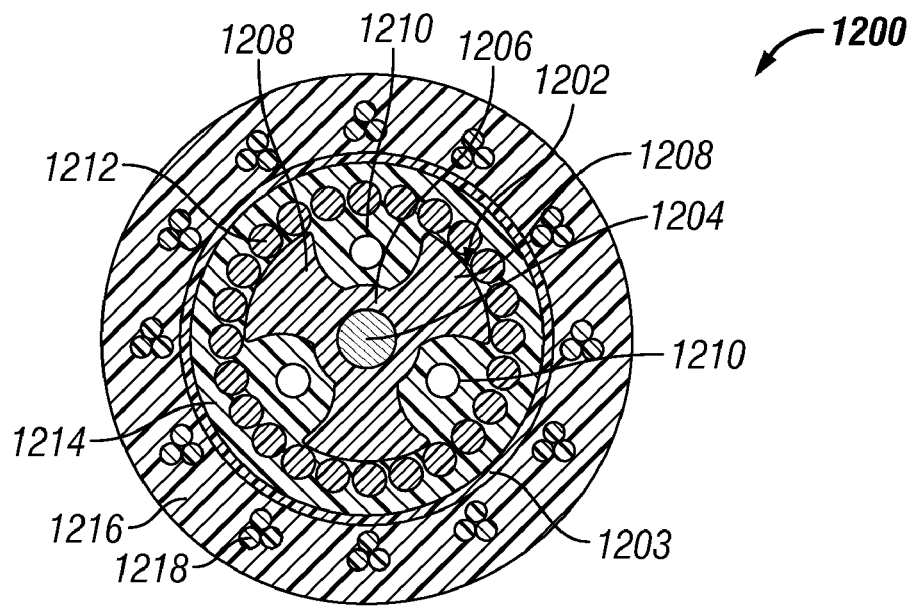
FIG. 12 is a radial cross-sectional view of an alternate embodiment of a cable.

Referring now to FIG. 12, there is shown an embodiment of a cable, indicated generally at 1200. The cable 1200 includes a cable core member 1202 enclosing a central electrical conductor 1204 at a center portion 1206 thereof and including a plurality of arms 1208 extending outwardly from the center portion 1206. A plurality of optical fibers 1210 are disposed between the arms 1208 and a plurality of electrical conductors 1212 are cabled preferably helically around the cable core member 1202 and optical fibers 1210. The electrical conductors 1212 may be solid conductors or stranded conductors.

The cable core member 1202, the optical fibers 1210 and the electrical conductors 1212 are embedded or encased within an inner layer 1214 formed from a polymeric material, for example. An outer layer 1216 formed from a polymeric material, for example, encases the inner layer 1214 and an optional tie layer 1203 is disposed between the inner layer 1214 and the outer layer 1216. A layer of strength members 1218 is disposed within the outer layer 1216. The strength members 1218 are preferably formed from a Kevlar material or similar material having similar material strength properties. Alternatively, a second layer of members (not shown) is disposed within the outer layer 1216 in order to obtain torque balance for the cable 1200.

The optical fibers 1210 are preferably in communication with, for example, an optical light source (not shown) and an optical sensor (not shown) and is operable to transmit data and/or telemetry between the optical sensor and the light source. The electrical conductors 1204 and 1212 are preferably in communication with, for example, a source of electrical power (not shown) and an electrical tool or device (not shown) and are operable to transmit electrical power between the electrical power source and the electrical tool or device. Preferably, one of the electrical conductors 1204 and 1212 handles positive current and the other of the electrical conductors 1204 and 1212 handles negative current.

Alternatively, the electrical conductors 1204 and 1212 of the cable 1200 are strength members and are formed from steel or similar metallic or other suitable material strength members. In such a cable, the conductors 1204 and 1212 are not in communication with either the electrical power source or the electrical tool or device and the cable 1200 is utilized solely to transmit data and/or telemetry, as will be appreciated by those skilled in the art.

The inner layer(s) 108, 308, 408, 608, 808, 1008, or 1214 may comprise a polyolefin (such as polyethylene (PE), ethylene-propylene copolymer (EPC), Poly(4-methyl-1-pentene) (TPX), or another suitable polyolefin) that provides good electrical insulation properties. The inner layer(s) 108, 308, 408, 608, 808, 1008, or 1214 may comprise a fluoropolymer (such as ETFE [Tefzel®] or ECTFE [Halar®]). The inner layer(s) 108, 308, 408, 608, 808, 1008, or 1214 may also comprise a thermoplastic elastomer (TPE) or thermoplastic vulcanizate (TPV), such as, but not limited to, Santoprene™ Engage™, Elexar™ or Infuse™.

The outer layer(s) 110, 310, 610, 810, 1010, or 1216 may comprise polyamide (Nylon) or thermoplastic polyurethane (TPU) or other suitable polymer. The outer layer(s) 110, 310, 610, 810, 1010, or 1216 may comprise a hard grade thermoplastic elastomer (TPE) or thermoplastic vulcanizate (TPV), such as, but not limited to, Santoprene™ Engage™, Elexar™ or Infuse™. The outer layer(s) 110, 310, 610, 810, 1010, or 1216 may comprise ethylene chlorotrifluoroethylene (ECTFE) such as Halar™, ethylene-tetrafluoroethylene copolymer (ETFE) such as Tefzel™, or any other suitable TPE, TPV or thermoset rubber. The outer layer(s) 110, 310, 610, 810, 1010, or 1216 preferably comprises a material that is durable, flexible, can bond to the tie layer(s) 112, 312 or 612 (discussed in more detail below), can bond to TPE interstitial filler materials, TPV interstitial filler materials or potting materials, and perform well by maintaining its material properties and thus the integrity of the cable in temperatures ranging from about −60° Celsius to about 150° Celsius or from about −60° Celsius to about 80° Celsius or from about −20° Celsius to about 80° Celsius, thereby allowing optical data and/or electrical power to be transmitted through the cable 100, 300, 400, 600, 800, or 1000.

The tie layer(s) 112, 312, or 612 may comprise the same polymer used in the inner layer 108 modified with maleic anhydride, acrylic acid, or another suitable material. The tie layer(s) 112, 312, or 612 facilitates bonding of the inner layer(s) 108, 308, 408, 608, 808, 1008, or 1214 and the outer layer(s) 110, 310, 610, 810, 1010, or 1216, thereby creating a continuous bonded insulation system for the cable 100, 300, 400, 600, 800, 1000, or 1200. The tie layer(s) 112, 312, or 612 may comprise polyethylene (PE) modified with a suitable functional chemical group such as maleic anhydride, acrylic acid, etc., (Bynel® by Dupont, Polybond® by Crompton Corporation etc.). The tie layer(s) 112, 312, or 612 may comprise polypropylene (PP) modified with a suitable functional chemical group such as maleic anhydride, acrylic acid, etc., (ADMER® by Mitsui Chemicals, Polybond® by Crompton Corporation etc.). The tie layer(s) 112, 312, or 612 may comprise ethylene-propylene copolymer (EPC) modified with a suitable functional chemical group such as maleic anhydride, acrylic acid, etc., (ADMER® by Mitsui Chemicals etc.). The tie layer(s) 112, 312, or 612 may comprise poly(4-methyl-1-pentene) (TPX) modified with a suitable functional chemical group maleic anhydride, acrylic acid, etc. (ADMER® by Mitsui Chemicals). The tie layer(s) 112, 312, or 612 may comprise maleic-anhydride modified or acrylic-modified TPV (such as Santoprene™) or any other TPE.

The tie layer(s) 112, 312, or 612 may comprise ethylene-tetrafluoroethylene copolymer (ETFE) modified with a suitable functional chemical group maleic anhydride, acrylic acid, etc. (Tefzel® HT 2202 by Dupont, NEOFLON™ ETFE EP-7000 by Daikin), ethylene fluorinated ethylene-propylene (EFEP) terpolymers (NEOFLON™ EFEP by Daikin), polychlorotrifluoroethylene (PCTFE) modified with a suitable functional chemical group (such as, but not limited to, maleic anhydride, acrylic acid), ethylene chlorotrifluoroethylene (ECTFE) modified with a suitable functional chemical group (such as, but not limited to, maleic anhydride, acrylic acid), expanded-Polytetrafluoroethylene (ePTFE) adhered to the inner insulating layer(s) 108, 308, 408, 608, 808, 1008, or 1214 (specially manufactured process such as high temperature heat-applied sintering and taping), or any type of modified fluoropolymer that can adhere to the inner layer(s) 108, 308, 408, 608, 808, 1008, or 1214 or the outer layer(s) 110, 310, 610, 810, 1010, or 1216. Preferably the tie layer(s) 112, 312, or 612 bonds to each of the inner layer(s) 108, 308, 408, 608, 808, 1008, or 1214 and the outer layer(s) 110, 310, 610, 810, 1010, or 1216.

Figure 13A:
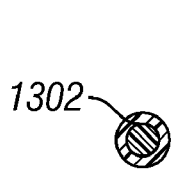
FIGS. 13a-13c are radial cross-sectional views, respectively, of steps for forming a cable assembly.
Figure 13B:
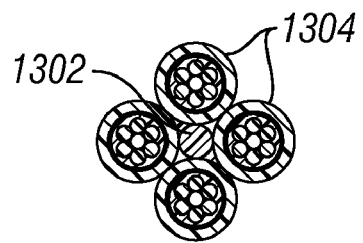
Figure 13C:
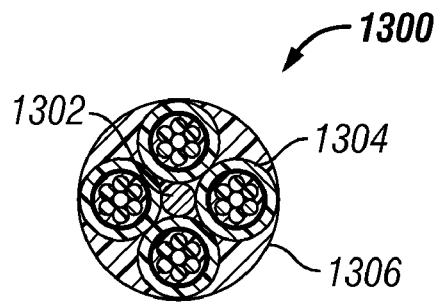

Referring now to FIGS. 13a-13c, there is shown a method for manufacturing a cable assembly or core 1300. The cable assembly 1300 includes a soft elastomer-coated filler yarn or rod 1302 that is preferably extruded as shown in FIG. 13a. At least one and preferably a plurality of cables or conductors 1304 such as, but not limited to, the cable 100 shown in FIG. 1 are cabled helically around the rod 1302 as shown in FIG. 13b. As the conductors 1304 compress against the rod 1302, the elastomeric material of the rod 1302 deforms to fill any interstitial voids between the rod 1302 and the conductors 1304. An additional filler layer of an elastomeric material 1306 is extruded over the rod 1302 and the conductors 1304 to complete the cable assembly 1300, as shown in FIG. 13c.

Figure 14A:
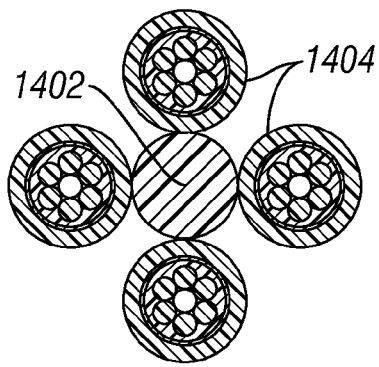
FIGS. 14a-14f are radial cross-sectional views, respectively, of alternate steps for forming a cable assembly.
Figure 14B:
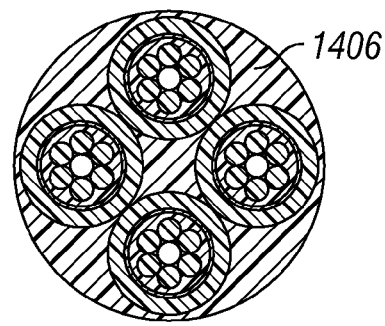
Figure 14C:
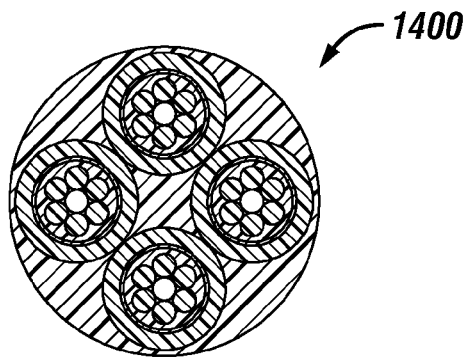
Figure 14D:
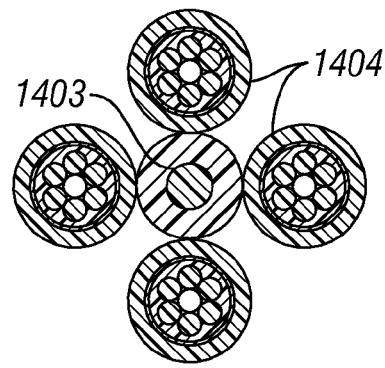
Figure 14E:
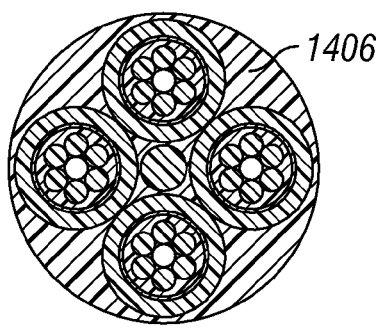
Figure 14F:
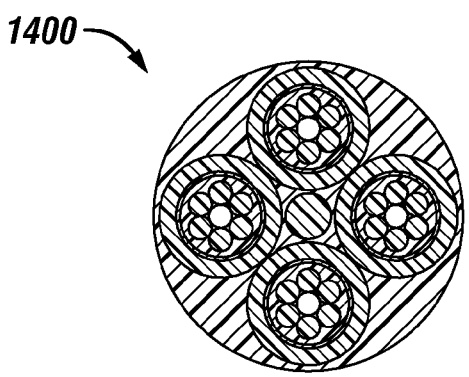

Referring now to FIGS. 14a-14c, there is shown a method for manufacturing a cable assembly or core 1400. The cable assembly 1400 includes a solid polymer rod 1402 (FIG. 14a) or hard TPE coated rod or yarn 1403 (FIG. 14d) is provided as shown in FIG. 14a and FIG. 14d. The rod or yarn 1402 or 1403 is then heated to soften the polymer. At least one and preferably a plurality of cables or conductors 1404 such as, but not limited to, the cable 100 shown in FIG. 1 are cabled helically around the rod 1402 as shown in FIGS. 14b and 14e. As the conductors 1404 compress against the rod 1402, the elastomer of the rod 1402 deforms to fill any interstitial voids between the rod 1402 and the conductors 1404. An additional filler layer of preferably soft elastomeric material 1406 such as, but not limited to a TPE or TPV material, is extruded over the rod 1402 and the conductors 1404 to fill any outer interstitial voids and complete the cable assembly 1400, as shown in FIGS. 14c and 14f. The cable assembly 1300 or 1400 is advantageously completely filled and requires no liquid rubber fillers. The elastomeric material 1306 or 1406 may be a TPE or TPV material such as, but not limited to, Santoprene™, Engage™, or Infuse™. To further minimize the potential for water flow along the conductors 1304 or 1404, the insulated conductors 1304 or 1404 and extruded elastomeric void filler 1306 or 1406 may be chemically bonded together during cabling or in the extruder.

Those skilled in the art will appreciate that the cable assemblies 1300 or 1400 may be formed from any number of cables and any combination of cables or conductors including, but not limited to, the cables 100, 300, 400, 600, 800, and 1000. The cable assemblies 1300 or 1400 may be assembled utilizing three cables or conductors 100, 300, 400, 600, 800, or 1000 to form a triad cable assembly 1400. The cable assemblies 1300 or 1400 may be assembled utilizing four cables or conductors 100, 300, 400, 600, 800, or 1000 to form a quad cable assembly 1400. The cable assemblies 1300 or 1400 may be assembled utilizing seven cables or conductors 100, 300, 400, 600, 800, or 1000 to form a hepta cable assembly 1400.

Referring now to FIGS. 15a-15f, the cable assemblies, such as the cable assemblies 1300 or 1400 shown in FIGS. 13 and 14 may then be encased in an outer layer 1500 formed from a polymeric material. The outer layer 1500 may include a plurality of strength members 1502 embedded therein. The strength members 1502 may be formed from any suitable material including, but not limited to, steel wire, high carbon steel, Kevlar, Vectran yarn or the like. The strength members 1502 may be oriented at a zero lay angle with respect to the cable core or cable assemblies 1300 or 1400 or the strength members 1502 may be cabled helically about the cable core or cable assemblies 1300 or 1400. The strength members 1502, when constructed from Kevlar or Vectran yarn, may be formed from a single yarn or from a plurality of yarns twisted together to form the strength member 1502.

Figure 15A:
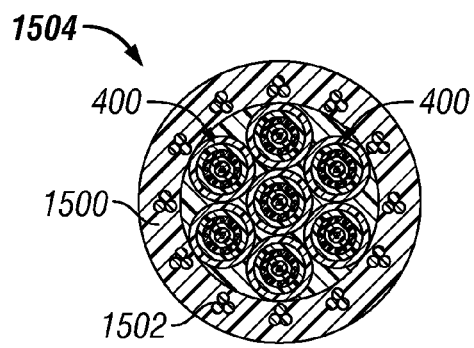
FIGS. 15a-15i are radial cross-sectional views, respectively, of embodiments of a cable assembly.

As shown in FIG. 15a, an embodiment of a cable assembly 1504 includes seven cables or conductors 400 arranged in a hepta configuration and enclosed by the outer layer 1500 having strength members 1502 embedded therein.

Figure 15B:
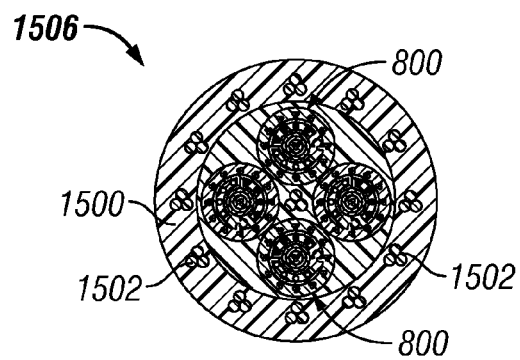

As shown in FIG. 15b, a cable assembly 1506 includes four cables or conductors 800 arranged in a quad configuration about a strength member 1502 and enclosed by the outer layer 1500 having strength members 1502 embedded therein.

Figure 15C:
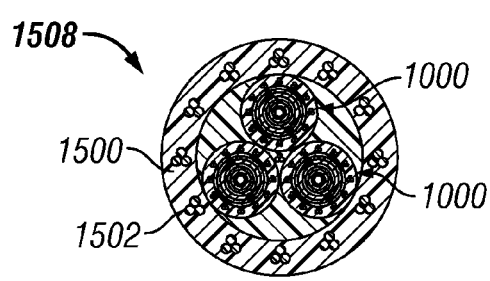

As shown in FIG. 15c, a cable assembly 1510 includes three cables or conductors 1000 arranged in a triad configuration and enclosed by the outer layer 1500 having strength members 1502 embedded therein.

Figure 15D:
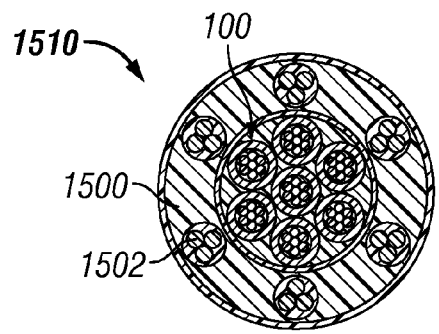

As shown in FIG. 15d, a cable assembly 1510 includes seven cables or conductors 100 arranged in a hepta configuration and enclosed by the outer layer 1500 having strength members 1502 embedded therein.

Figure 15E:
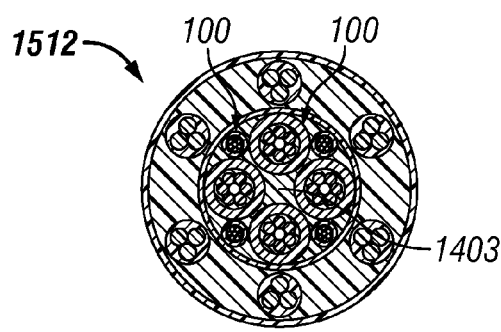

As shown in FIG. 15e, a cable assembly 1512 includes four cables or conductors 100 arranged in a quad configuration about a strength member 1502 and enclosed by the outer layer 1500 having strength members 1502 embedded therein. The assembly 1514 includes four smaller diameter cables or conductors 100 arranged in the interstices of the larger diameter cables or conductors 100.

Figure 15F:
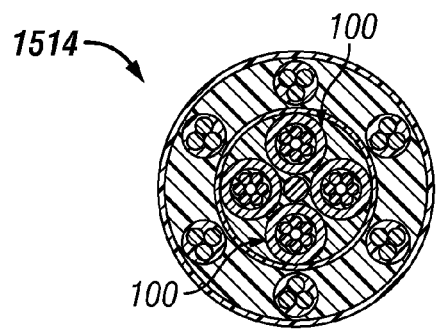

As shown in FIG. 15f, a cable assembly 1514 includes four cables or conductors 100 arranged in a quad configuration about a strength member 1502 and enclosed by the outer layer 1500 having strength members 1502 embedded therein.

Figure 15G:
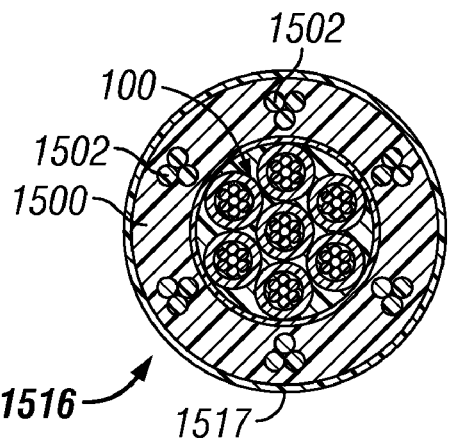

As shown in FIG. 15g, a cable assembly 1516 includes seven cables or conductors 100 arranged in a hepta configuration and enclosed by the outer layer 1500 and an outer shell 1517 and including strength members 1502 embedded in the outer layer 1500.

Figure 15H:
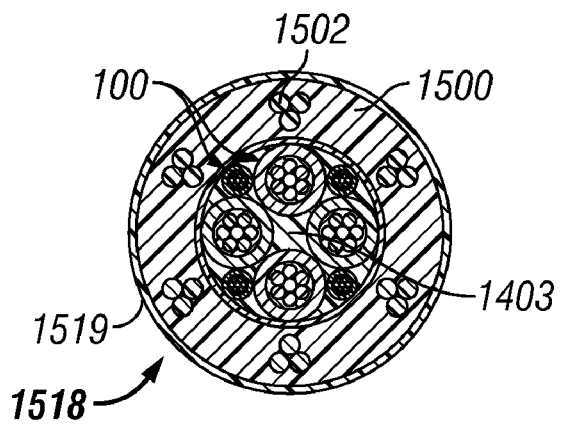

As shown in FIG. 15h, a cable assembly 1518 includes four cables or conductors 100 arranged in a quad configuration about a strength member 1502 and enclosed by the outer layer 1500 and an outer shell 1519 and including strength members 1502 embedded therein. The assembly 1518 includes four smaller diameter cables or conductors 100 arranged in the interstices of the larger diameter cables or conductors 100.

Figure 15I:
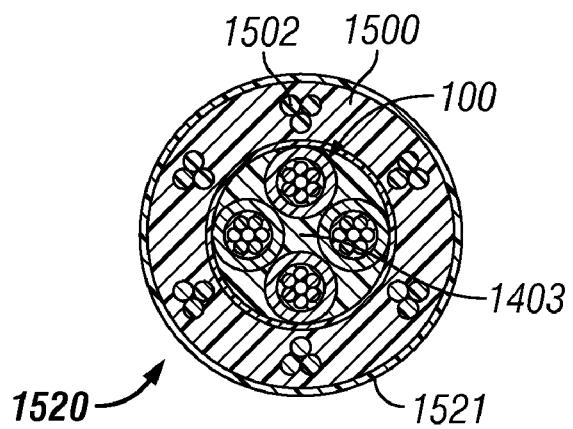

As shown in FIG. 15i, a cable assembly 1520 includes four cables or conductors 100 arranged in a quad configuration about a strength member 1502 and enclosed by the outer layer 1500 and an outer shell 1521 and including strength members 1502 embedded in the outer layer 1500.

The outer layer 1500 may be a soft matrix such as TPE or TPV and the outer shells 1517, 1519, and 1521 may be formed from nylon or any suitable material to provide a tough jacket to prevent damage from field abuse and to provide rigidity to the cable assemblies 1516, 1518, or 1520.

Figure 16A:
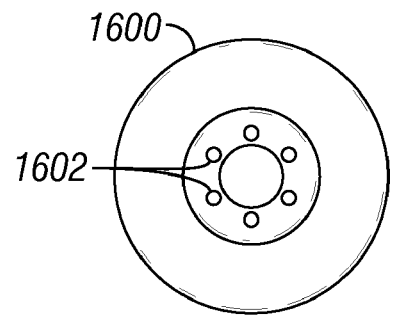
FIGS. 16a and 16b are an end view and plan view, respectively, of an extruder for forming a cable.
Figure 16B:
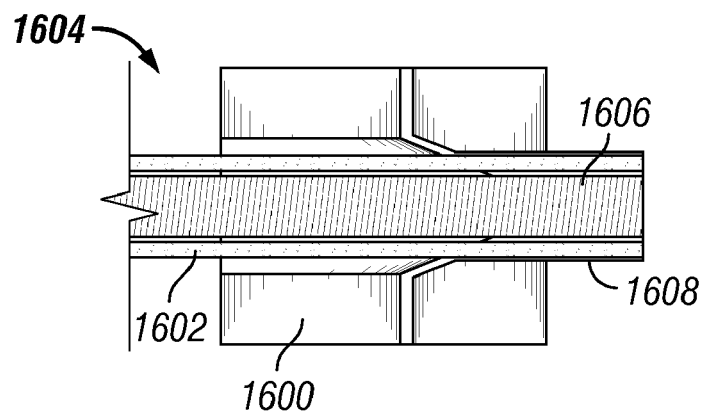

Referring now to FIG. 16a, there is shown an end view of an extruder 1600 that comprises a plurality of apertures 1602 for threading strength members, such as the strength members 1502, therethrough to allow for placing the strength members 1502 at a zero lay angle with respect to the cable core or cable assembly 1300 or 1400. FIG. 16b shows a side cross-sectional view of the extruder 1600 with a cable 1604 passing therethrough and including an inner layer 1606 and an outer layer or jacket 1608 being extruded over the strength members 1502 and inner layer 1606.

Figure 17A:
FIGS. 17a and 17c are axial and radial cross-sectional views, respectively, of a shield layer and cable including a shield layer of an embodiment of a cable
Figure 17B:
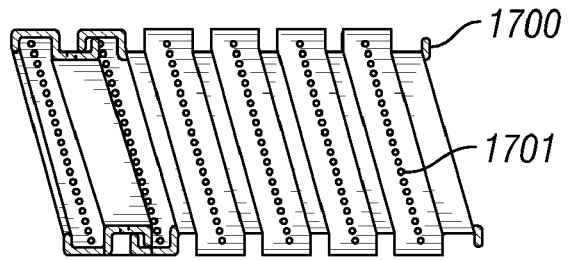
FIG. 17b is a side view of a shield layer.
Figure 17C:
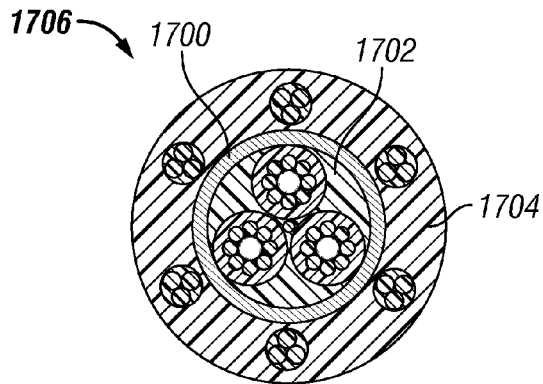
Figure 18B:
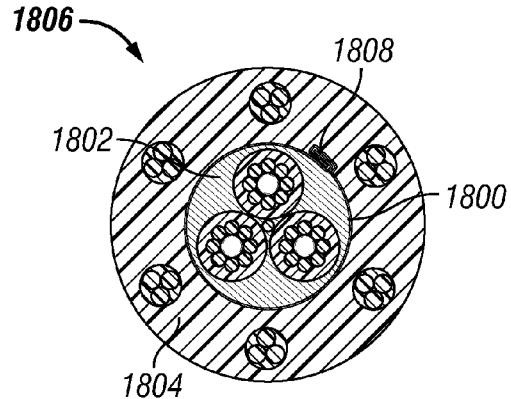
FIG. 18a is a side view and FIG. 18b is a radial cross-sectional view of an embodiment of a shield layer and cable including a shield layer.
Figure 18A:
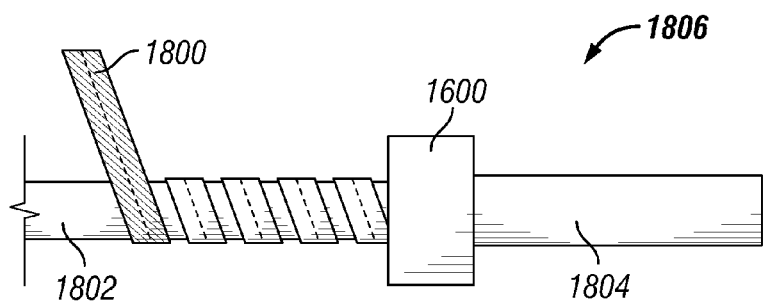
Figure 19:
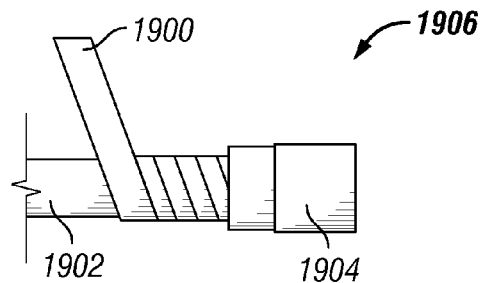
FIG. 19 is a side view of an embodiment of a cable having a shield layer.

Referring now to FIGS. 17-19, the cables, such as the cables 100, 300, 400, 600, 800, or 1000 include a shield or armor layer between the inner layer and outer layer of the cable 100, 300, 400, 600, 800, or 1000. The shield layer may be utilized in any number of the cables 100, 300, 400, 600, 800, or 1000. As shown in FIGS. 17a-17c, the shield layer may comprise an interlocking metallic tape 1700 disposed between an inner layer 1702 and an outer layer or jacket 1704 of a cable assembly 1706. The tape 1700 may include holes 1701 extending therethrough to allow the outer jacket 1704 to bond with the inner layer 1702. As shown in FIGS. 18a-18b, the shield layer may comprise an interlocking metallic tape 1800 disposed between an inner layer 1802 and an outer layer or jacket 1804 of a cable assembly 1806. The metallic tape 1800 may be folded over to form a locked edge 1808, as shown in FIG. 18b. As shown in FIG. 19, the shield layer may comprise an overlapping or cigarette-wrapped metallic tape 1900 disposed between an inner layer 1902 and an outer layer or jacket 1904 of a cable assembly 1906. Placement of the shield layer 1700, 1800, or 1900 between the core 1702, 1802, or 1902 and the jacket 1704, 1804, or 1904 may be preferable because its smaller diameter will requires less material for the shield layer 1700, 1800, or 1900, resulting in a lower weight cable than if the shield layer 1700, 1800, or 1900 is placed over the outer jacket 1704, 1804, or 1904.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A fiber optic cable, comprising:
an optical fiber;
a pair of shaped profiles disposed around the optical fiber;
a plurality of electrical conductors embedded within each shaped profile of the pair of shaped profiles;
a polymeric inner layer individually encasing the each shaped profile of the pair of shaped profiles, wherein the polymeric inner layers separate the each shaped profile of the pair of shaped profiles from the other of the pair of shaped profiles;
a polymeric intermediate layer encasing the optical fiber and separating the optical fiber from the pair of shaped profiles and the each shaped profile of the pair of shaped profiles from the other of the pair of shaped profiles; and
a polymeric outer layer encasing the polymeric inner layers, the polymeric intermediate layer, the pair of shaped profiles, and the optical fiber, wherein the outer layer is operable to maintain integrity of the fiber optic cable within a predetermined temperature range.

2. The fiber optic cable of claim 1, wherein the predetermined temperature range is from about −60° Celsius to about 150° Celsius.

3. The fiber optic cable of claim 1, wherein the polymeric outer layer comprises one of polyamide, thermoplastic polyurethane, thermoplastic vulcanizate, a hard grade thermoplastic elastomer, ethylene chlorotrifluoroethylene, ethylenetetrafluoroethylene copolymer, and combinations thereof.

4. The fiber optic cable of claim 1, wherein the polymeric inner layer comprises one of polyolefin, fluoropolymer, thermoplastic elastomer, thermoplastic vulcanizate and combinations thereof.

5. The fiber optic cable of claim 1, further comprising at least one strength member enclosed within the outer layer.

6. The fiber optic cable of claim 5, wherein the at least one strength member is operable to transmit electrical power.

7. The fiber optic cable of claim 5, wherein the at least one strength member is formed from Kevlar material.

8. The fiber optic cable of claim 5, wherein the at least one strength member is oriented at a zero lay angle with respect to the cable core, wherein the cable core comprises the optical fiber and the pair of shaped profiles.

9. The fiber optic cable of claim 1, further comprising a tie layer disposed between the polymeric inner layers and the outer layer and operable to bind with both the inner layers and the outer layer.

10. The fiber optic cable of claim 9, wherein the tie layer comprises one of modified polyethylene, modified fluoropolymer, modified polypropylene, modified ethylene-propylene copolymer, modified poly(4-methyl-1-pentene), modified thermoplastic vulcanizate, modified thermoplastic elastomer, modified ethylene-tetrafluoroethylene copolymer, modified ethylene fluorinated ethylene-propylene, modified polychlorotrifluoroethylene, modified ethylene chlorotrifluoroethylene, expanded-Polytetrafluoroethylene (ePTFE) and combinations thereof.

11. The fiber optic cable of claim 1, wherein the electrical conductors disposed in the pair of shaped profiles comprise one of solid conductors, stranded conductors, and arc-shaped conductors.

12. The fiber optic cable of claim 1, wherein the each profile of the pair of shaped profiles comprises one selected from the group of polymeric shaped profiles, metallic shaped profiles and combinations thereof.

13. The fiber optic cable of claim 1, wherein the each shaped profile of the pair of shaped profiles comprises a non-circular cross section.

14. The fiber optic cable of claim 13, wherein the pair of shaped profiles form a substantially circular cross section when the pair of shaped profiles are joined together.

15. The fiber optic cable of claim 13, wherein the pair of shaped profiles form a non-circular cross section when the pair of shaped profiles are joined together.

16. The fiber optic cable of claim 1, wherein the pair of shaped profiles are joined together at a hinge point.

17. The fiber optic cable of claim 16, wherein the hinge point is formed of metal and does not have an electrical conductor embedded therein.

18. The fiber optic cable of claim 16, wherein the profile of the each shaped profile of the pair of shaped profiles is not circular.

19. The fiber optic cable of claim 16, wherein the pair of shaped profiles form a substantially circular cross section when the each shaped profile of the pair of shaped profiles are joined.

* * * * *